Aug. 14, 1928.

W. H. DALTON 1,680,768

ELECTRIC TOASTER

Filed July 1, 1924  2 Sheets-Sheet 1

Inventor.
William H. Dalton
by Heard Smith & Tennant.
Attys.

Aug. 14, 1928.

W. H. DALTON

ELECTRIC TOASTER

Filed July 1, 1924    2 Sheets-Sheet 2

1,680,768

Inventor.
William H. Dalton
by Heard Smith & Tennant.
Attys.

Patented Aug. 14, 1928.

1,680,768

UNITED STATES PATENT OFFICE.

WILLIAM H. DALTON, OF SALEM, MASSACHUSETTS.

ELECTRIC TOASTER.

Application filed July 1, 1924. Serial No. 723,486.

This invention relates to electric toasters and one feature of the invention relates to a novel way of holding and reversing or turning the bread to be toasted. In accordance with this feature of the invention the bread to be toasted is supported in a holder which is mounted to swing toward and from the heating element and is also capable of turning about a pivot at right angles to the axis about which it swings in moving toward and from the heating element. In order to turn the toast the bread-holding member is swung away from the heating element and is then turned about its central axis and then swung back into position again. The construction is such that this can be easily accomplished with substantially one movement of the hand.

The invention also includes other features which will be more fully hereinafter set forth and then pointed out in the appended claims.

Referring now to the drawings wherein I have illustrated a selected embodiment of my invention for the purpose of illustrating the principle thereof, Fig. 1 is a side view of a toaster embodying my invention;

Figure 1:
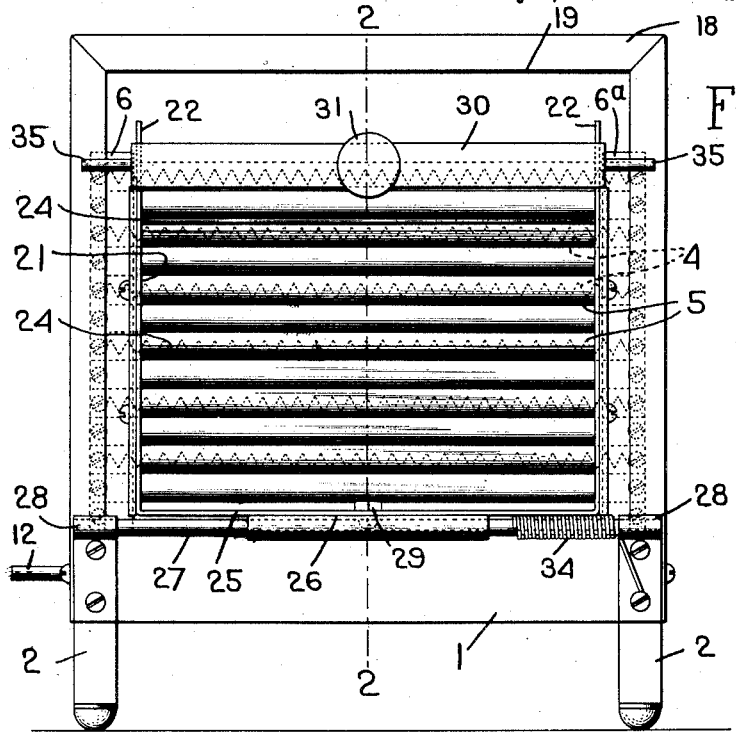

The toaster comprises a suitable frame 1 having legs 2 by which it is supported and having a floor or base portion 3 on which the heating element is supported, said heating element extending vertically from the base.

The heating element comprises a plurality of individual heating coils 4 which are preferably connected in parallel. Each heating coil 4 is enclosed in a protecting tube 5 of some suitable dielectric material such for instance as glass or mica. If glass is employed I will preferably use glass of the kind that will stand heat without danger of breaking.

The tubes 5 in which the heating elements are received are ranged one above the other in a tier and are retained in position through the medium of retaining members 6 6ª, there being one retaining member at each end of the tier of tubes. Each retaining member comprises the two side pieces 7 arranged parallel to each other and between which the ends of the tubes are received, these side pieces extending vertically from the base 3. Each side piece is shown as provided at its lower end with a foot 8 which rests on and is secured to the base through a suitable clamping screw 9. A convenient construction is that herein shown in which the two side pieces 7 are formed from a single strip of metal that is bent into elongated U shape and the ends of the arms of which are bent laterally to form the feet 8.

The individual coil-receiving tubes 5 are prevented from endwise movement by stop screws 10 which are screwed through one of the sides 7 of each retaining member 6, these screws overlying the ends of the tubes 5.

The two retaining members 6 6ª are insulated from the frame and are connected in series in the heating circuit while the individual coils 4 are connected in parallel between the retaining members 6. These retaining members are insulated from the base by means of insulation 11 and one of the retaining members is electrically connected to one terminal 12 of the toaster and the other is electrically connected to the other terminal 13 thereof. The terminal 12 is insulated from the base and is provided with a connection 14 which is connected by an insulated wire 15 with one of the screws or binding posts 9 by which the retaining member 6ª is secured to the base thereby electrically connecting said retaining member 6ª with the terminal 12. The terminal 13 is also insulated from the base and is provided with a connection 14 that is connected by an insulated wire 16 to one of the screws or binding posts 9 by which the retaining member 6 is secured to the base. The two retaining members are thus insulated from the base but connected in series.

As stated above the individual heating coils 4 are connected in parallel to the two retaining members 6, 6ª. While any suitable electrical connection for this purpose may be employed I prefer to make use of the screws 10. As herein shown the ends 17 of each coil 4 are extended out through the ends of the tube 5 and are held or clamped under the head of the corresponding screws 10. By this means the coils 4 are connected in parallel and are independently removable.

I may employ as many heating coils 4 as desired or necessary. I have illustrated in the drawings a construction in which the heating coils are located in a portion only of the tubes 5 but it is within my invention to employ coils in each of the tubes as well as in only a portion of them.

It will be noted that the individual tubes 5 are separate from each other and are retained in place simply by the sides 7 of the retaining members and the screws 10. Therefore, by removing the screws 10 for any tube the latter may be readily withdrawn from the retaining member.

Another advantage of this construction is that the individual heating coils 4 are easily removable and replaceable independent of other coils so that in case any coil becomes burnt out or damaged it may be easily removed and replaced by a fresh coil.

The frame which supports the device includes an enclosing shell 18 covering the ends of the retaining members and the top of the tubes, said shell being open at each side as shown at 19.

The slices 20 of bread to be toasted are retained in holding members 21. These members have a general U-shape with the arms 22 thereof connected by two rows of small rods 23, 24, said two rows forming a space between them in which the slices of bread 20 are placed. This holder thus provides a receptacle which is open at the top for the reception of slices of bread, said slices being supported on the bottom 25 of the holder and being retained from endwise movement by the ends 22 thereof. Each of these holders is mounted to swing toward and from the heating element and also is arranged to be turned about an axis at right angles to the axis of the swinging movement to provide for turning or reversing the bread being toasted.

Each U-shaped holder 21 is secured to a rocking member 26 which is fast on a shaft 27 journalled in brackets 28 carried by the frame. This rod 27 provides a pivotal axis about which the bread holder can be swung toward and from the heating element. The connection between the bread holder and the rocking member 26 is a swivel one, said bread holder being swivelled to the rocking member by a pivot connection 29 which is situated centrally of the bottom 25 of the bread holder. The upper end of each bread holder has pivotally connected thereto a bail-shaped handle 30 which is provided with a knob 31, said handle having the arms 32 which are pivotally connected to the sides 22 of the bread holder as shown at 33.

Figure 2:
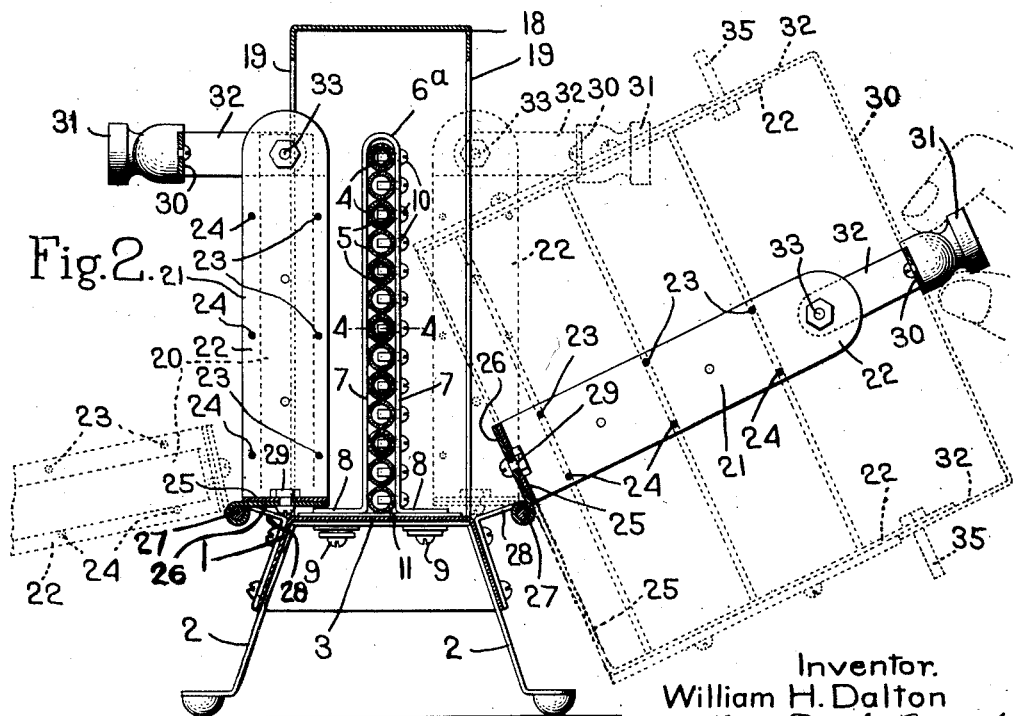
Fig. 2 is a vertical sectional view on substantially the line 2—2, Fig. 1.
Figure 3:
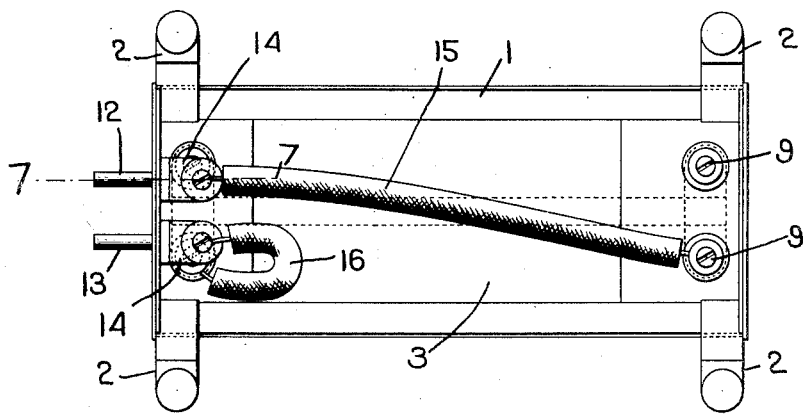
Fig. 3 is a bottom plan view.
Figure 4:
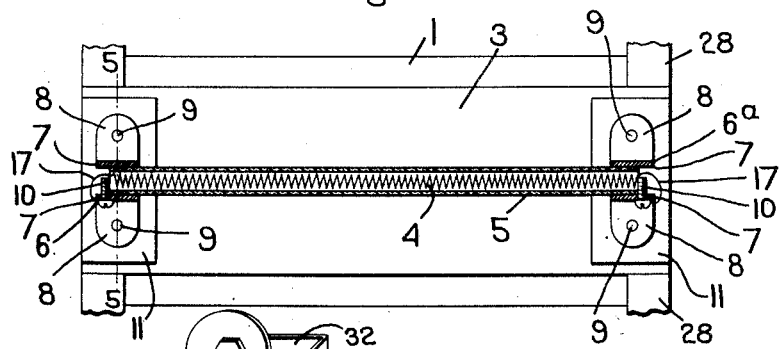
Fig. 4 is a section on the line 4—4, Fig. 2.
Figure 6:
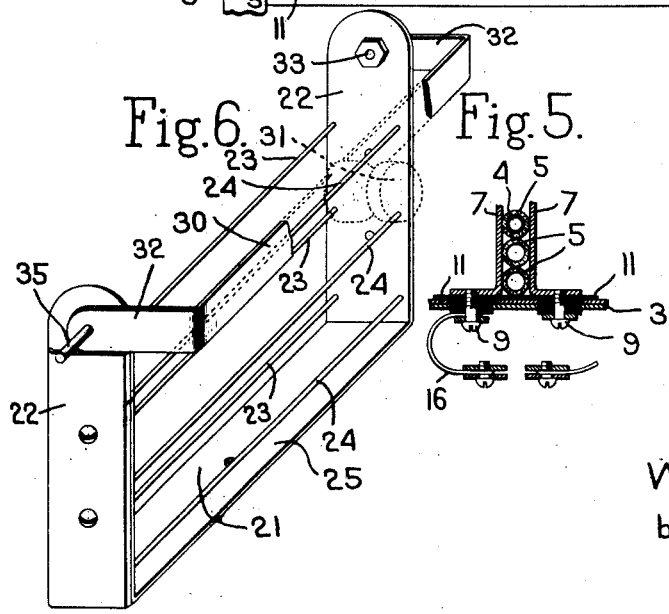
Fig. 6 is a perspective view of the bread-holding member with a portion broken out.
Figure 5:
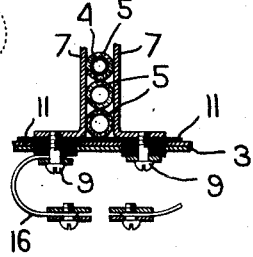
Fig. 5 is a section on the line 5—5, Fig. 4.
Figure 7:
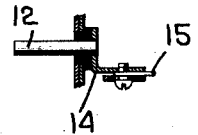
Fig. 7 is a section on the line 7—7, Fig. 3.

The shaft 27 is acted upon by a suitable spring 34 which tends to hold the parts in operative position shown at the left in Fig. 2.

In using the device the bread-holding members may be swung away from the heating member sufficiently to permit the slices of bread to be inserted thereinto from the top after which said members are placed in their operative position shown in Fig. 1 and in full lines at the right in Fig. 2. The sides of the bread-holding members are provided with stop pins 35 which engage the shell 18 and serve to hold the bread properly spaced from the heating element. When one side of the slice has been toasted and it is desired to turn the slice the operator grasps the knob 31 and swings the bread-holding member into substantially the position shown in full lines at the right Fig. 2 and then by giving a turning motion to the knob 31 the bread-holding member will be turned bodily about its axial pivot 29 thereby reversing or turning the slice of bread.

The dotted lines at the right in Fig. 2 show the bread-holding member in the process of being turned about its axial pivot 29. After the bread has been reversed then the bread-holding member is swung back into its operative position again.

To remove the slice of toast from the holder it is simply necessary to swing the latter down into the dotted line position at the left in Fig. 2. When in this position the toast will easily slide out of the open end of the holder which is now lower than the pivoted end.

The shell 18 is preferably removably attached to the base so that it can be readily removed whenever it is necessary to remove any one of the coils or to make any repairs thereon.

The bail member 30 and knob 31 may function as a rest for the upper end of the bread-holding member when the latter is swung into dotted line position shown at the left in Fig. 2.

While I have illustrated herein a selected embodiment of my invention I do not wish to be limited to the constructional features shown.

I claim:

1. In a toaster, the combination with a frame of a heating element thereon, a swinging support mounted on the frame and a bread-holding element swivelled to said support to turn about an axis that is situated at right angles to the axis of the swinging support.

2. In a toaster, the combination with a frame, of a heating element thereon, a rocking member pivoted to the frame, a bread-holding element swivelled to the rocking member to turn about an axis at right angles to the axis of the swinging support and a bail-shaped handle pivotally connected to the bread-holding member.

3. In a toaster, the combination with a frame, of a heating element carried thereby, a swinging support pivoted to the lower portion of the frame to turn about a horizontal axis, and a bread-holding element swivelled to the swinging support to turn about an axis at right angles to the axis of the support.

4. In a toaster, the combination with a frame, of a heating element carried thereby, a swinging support pivoted to the lower portion of the frame to turn about a horizontal axis, a bread-holding element pivoted at its lower end to said support to turn about an axis at right angles to that of the support, and a handle pivoted to the upper end of the bread-holding element and by which it may be operated.

In testimony whereof, I have signed my name to this specification.

WILLIAM H. DALTON.